May 17, 1927.
K. P. NEILSEN
PUMP PLUNGER ASSEMBLY
Filed May 18, 1926
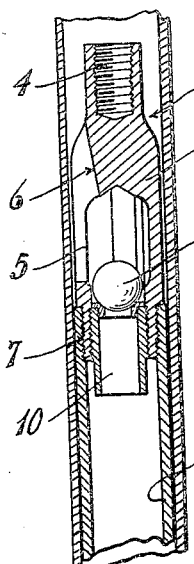
Fig. 1.
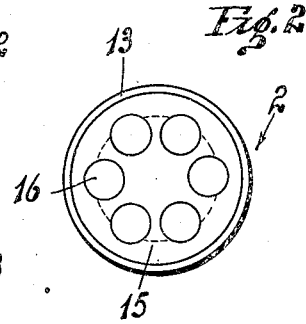
Fig. 2.
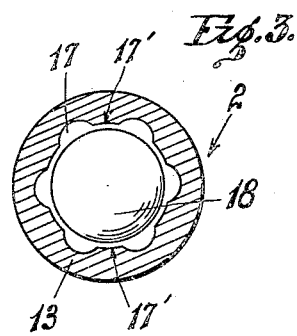
Fig. 3.
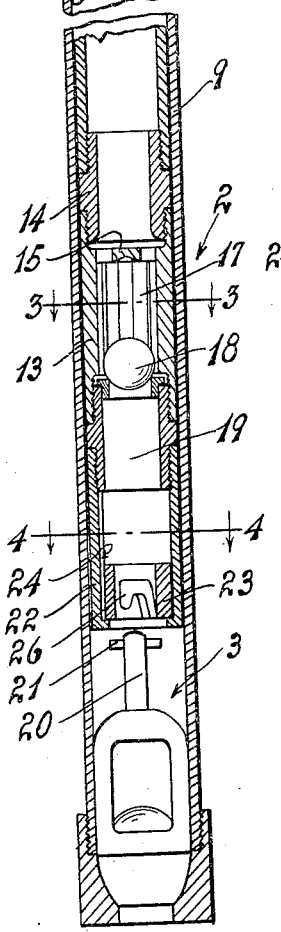
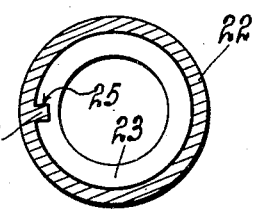
Fig. 4.
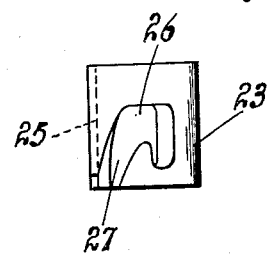
Fig. 5.
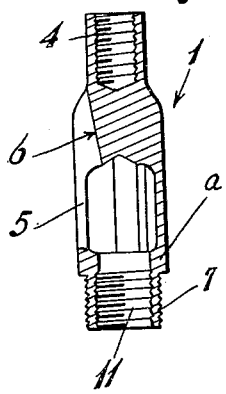
Fig. 6.
Fig. 7.
INVENTOR.
KARL P. NEILSEN
BY
H. A. Dreckman
ATTORNEY.

Patented May 17, 1927.

1,628,901

UNITED STATES PATENT OFFICE.

KARL P. NEILSEN, OF LONG BEACH, CALIFORNIA.

PUMP-PLUNGER ASSEMBLY.

Application filed May 18, 1926. Serial No. 109,828.

An object of my invention is to provide a pump plunger, in which the passages therein provide an unrestricted flow for the oil.

Another object is to provide a plunger which is not so liable to become clogged with sand.

Further objects are to provide a top open valve for a plunger embodying greater strength, larger passages, and which is simple in construction and inexpensive to manufacture.

Other objects, advantages, and features of the invention may appear in the accompanying drawing, the subjoined detailed description and the appended claims.

In the drawing—

Fig. 1, is a fragmentary longitudinal sectional view of my plunger.

Fig. 2, is an enlarged plan view of the lower plunger valve.

Fig. 3, is an enlarged sectional view taken on line 3—3, Fig. 1.

Fig. 4, is an enlarged sectional view taken on line 4—4, Fig. 1.

Fig. 5, is a side elevation of the standing valve pulling sleeve, on a larger scale than Fig. 1.

Fig. 6, is a longitudinal sectional view of the plunger top valve cage.

Fig. 7, is a side elevation of the valve seat for the top cage.

Referring more particularly to the drawing, my pump plunger comprises a top valve 1, a bottom valve 2, and a standing valve 3. In the top valve cages heretofore in use a threaded pin was formed thereon whereby the valve was coupled to the sucker rod. This pin frequently broke in operation thus requiring a fishing job. In a valve cage $a$ I provide a threaded box 4, on the top thereof into which the sucker rod screws. This construction gives great strength to the valve and an easy taper can be formed from the enlarged body to the top, thus adding to the strength of the box, and providing a stream line for the flow of oil. The usual openings 5 are provided in the side of the valve cage, and a long taper 6 extends towards the top of the cage thus providing an easier outlet for the oil without churning the same, thus increasing the efficiency of the pump. The cage is externally threaded on the lower end, as at 7, and screws into the top of the plunger 8. Due to the cage screwing directly into the top of the plunger greater accuracy in alining the cage is possible, and a very small clearance only is necessary between the cage and the pump barrel 9, thus providing little space for the accumulation of sand and minimizing the danger of the pump sanding up. A valve seat 10 is threaded into the lower end of the cage $a$ on the internal threads 11. With this construction the valve seat will not loosen and leak due to the jar of the plunger hitting the standing valve 3. The usual ball 12 operates in the cage $a$.

The lower plunger valve 2, comprises a blind cage 13, which is secured to the plunger 8 by a threaded sleeve 14. A spider 15 is formed at the top of the cage and in drilling the openings 16 therein, longitudinal slots 17 are simultaneously formed in the cage. Thus it will be seen that the battering of the ball 18 on the spider 15 can not close the openings 16 therethrough, which is a fault heretofore encountered in cages of this character, in my cage the slots 17 opening into the openings 16 always providing a passage for the oil. The ball 18 rests on a seat 19 threaded into the lower end of the cage 13. The ribs 17' act to guide the ball to the center and prevent wearing of the cage.

In standing valve pullers heretofore in use, seating of the plunger on the valve frequently resulted in shearing off the engaging pins thus rendering the puller ineffective. In my puller I provide the standing valve 3 with a post 20 from which pins 21 extend. A tube 22 is threaded onto the lower end of the seat 19 and a valve pulling sleeve 23 is slidably mounted in the tube. A key 24 in the tube enters a seat 25 in the sleeve thus holding the sleeve against rotation but permitting longitudinal movement thereof. A pair of bayonet slots 26, 26 are formed in the sleeve 23 in which the pins 21 are adapted to enter. To engage the pins 21 the plunger 8 is lowered and rotated until the pins enter the slots 26, after which an upward movement of the plunger will pick up the standing valve. To facilitate the entrance of the pins 21 into the slots 26, the entering reach 27 of said slots slants upwardly, the object being to force the pins into the slots even if said pins are not entered to the top thereof. The slidable sleeve 23 prevents injury to the pins 21 if the plunger 8 should drop below its normal working position.

Having described my invention I claim:

1. In a pump, a plunger in said pump, a top valve on said plunger, said top valve comprising an open cage, and a threaded box on the upper end of said cage, adapted to receive the end of the sucker rod, the lower end of said cage being threaded to screw into the top of the plunger and a valve seat adapted to screw into the lower end of the cage upon which a ball is adapted to seat.

2. In a pump, a plunger in said pump, a top valve on said plunger, said top valve comprising an open cage, and a threaded box on the upper end of said cage, adapted to receive the end of the sucker rod, the lower end of said cage being threaded to screw into the top of the plunger and a valve seat adapted to screw into the lower end of the cage upon which a ball is adapted to seat, a bottom valve on said plunger, said bottom valve comprising a blind cage having longitudinal slots on the inner surface thereof through which the liquid is adapted to flow, and a ball valve in said blind cage.

3. In a pump, a plunger in said pump, a top valve on said plunger adapted to screw therein, said top valve comprising an open cage, said cage tapering upwardly to a threaded box adapted to receive the end of the sucker rod, said cage having openings in the side thereof, and a long taper extending from said openings towards the top of the cage to provide a stream line flow for the liquid, and a valve seat adapted to screw into the lower end of the cage upon which a ball is adapted to seat.

In testimony whereof I affix my signature.

KARL P. NEILSEN.